(12) United States Patent
Goertz et al.

(10) Patent No.: US 11,571,864 B2
(45) Date of Patent: Feb. 7, 2023

(54) METHODS OF CREATING COMPOSITE PARTS WITH FIBERS IN A DESIRED ORIENTATION

(71) Applicant: The Boeing Company, Chicago, IL (US)

(72) Inventors: Samuel R. Goertz, Issaquah, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 16/584,488

(22) Filed: Sep. 26, 2019

(65) Prior Publication Data
US 2021/0094250 A1 Apr. 1, 2021

(51) Int. Cl.
*B29C 70/14* (2006.01)
*B29C 71/00* (2006.01)
*B29C 70/88* (2006.01)

(52) U.S. Cl.
CPC .......... *B29C 71/0081* (2013.01); *B29C 70/14* (2013.01); *B29C 70/882* (2013.01); *B29C 71/0072* (2013.01)

(58) Field of Classification Search
CPC . B29C 71/0081; B29C 71/0072; B29C 70/14; B29C 70/543
See application file for complete search history.

(56) References Cited

U.S. PATENT DOCUMENTS

| | | | | |
|---|---|---|---|---|
| 4,671,758 A | * | 6/1987 | Tassone | B29C 70/14 425/174.8 E |
| 5,846,356 A | * | 12/1998 | Vyakarnam | B29C 70/543 156/62.6 |
| 2011/0175259 A1 | * | 7/2011 | Turng | B29C 70/62 264/437 |
| 2013/0171406 A1 | * | 7/2013 | Suehiro | B82Y 40/00 428/98 |
| 2015/0147560 A1 | * | 5/2015 | Moaseri | C08K 7/06 428/298.1 |
| 2016/0168342 A1 | * | 6/2016 | Hsiao | B29C 70/443 523/466 |
| 2016/0280890 A1 | * | 9/2016 | Kumar | C08L 101/00 |
| 2019/0096540 A1 | * | 3/2019 | Baughman | B29C 70/14 |
| 2020/0262992 A1 | * | 8/2020 | Ahn | B32B 27/12 |
| 2021/0008591 A1 | * | 1/2021 | Lindefjeld | B05D 1/28 |

* cited by examiner

*Primary Examiner* — Timothy Kennedy
*Assistant Examiner* — Alexander A Wang
(74) *Attorney, Agent, or Firm* — Kolitch Romano Dascenzo Gates LLC (57) ABSTRACT

Methods comprise generating an electric field; encompassing fibers within the electric to orient the fibers in a desired orientation relative to each other; and subsequent to the encompassing, fixing the fibers in the desired orientation within a matrix material to at least partially create a composite part.

30 Claims, 12 Drawing Sheets

METHODS OF CREATING COMPOSITE PARTS WITH FIBERS IN A DESIRED ORIENTATION

FIELD

The present disclosure relates to creating composite parts.

BACKGROUND

Current techniques for creating composite parts with chopped fiber composite pieces result in the random orientation of reinforcing fibers throughout the composite parts. While such a random orientation of reinforcing fibers may provide for uniform material properties across composite parts, it may be desirable for material properties to vary across composite parts depending on the application of the composite parts, the application or specific structure of a sub-region of composite parts, etc. Current techniques do not permit for such customized material properties at different locations across composite parts.

SUMMARY

Methods comprise generating an electric field; encompassing fibers within the electric field to orient the fibers in a desired orientation relative to each other; and subsequent to the moving, fixing the fibers in the desired orientation within a matrix material to at least partially create a composite part.

DESCRIPTION

Figure 1:
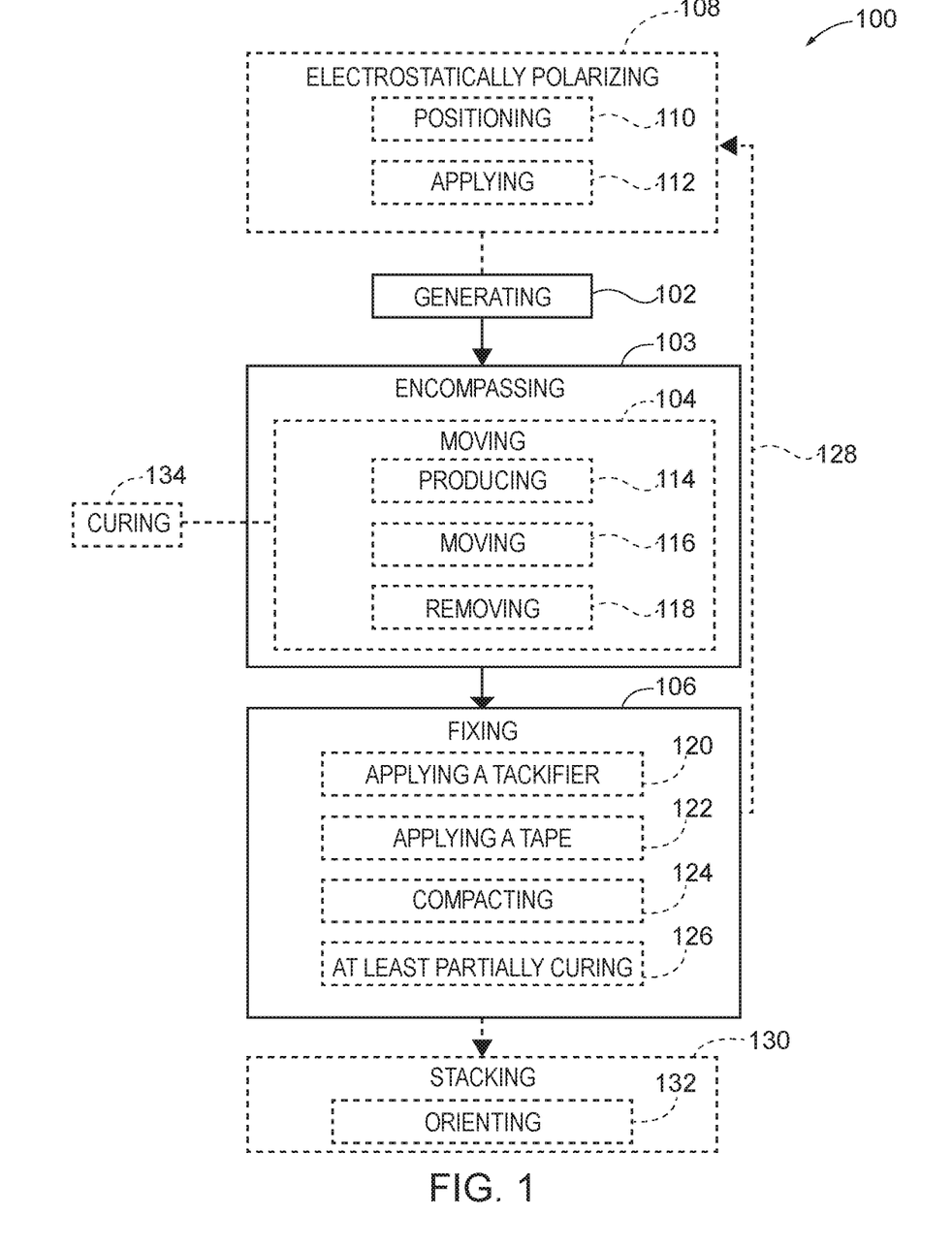
FIG. 1 is a flowchart schematically representing methods according to the present disclosure.

FIG. 1 schematically provides a flowchart that represents illustrative, non-exclusive examples of methods 100 according to the present disclosure. In FIG. 1, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 1 are not limiting and other methods and steps are within the scope of the present disclosure, including methods having greater than or fewer than the number of steps illustrated, as understood from the discussions herein.

Methods 100 according to the present disclosure may be described as methods of creating composite parts, methods of at least partially creating composite parts, and/or methods of selectively aligning and/or manipulating the orientation of fibers within a composite part as it is being created. In particular, methods 100 result in, or lead to, the fibers within a fiber-reinforced composite part having a desired orientation, which orientation may be selected for various properties, as discussed herein. Because a desired orientation of the fibers may be controlled, failure modes of the resulting composite part are more predictable than under current chopped fiber composite molding techniques. Methods 100 may be used with current techniques for directional ply lay-ups, and to steer plies, tows, or tapes. Methods 100 may be used to create a two-dimensional structure of chopped fiber plies, or fibers can be aligned at various angles between directional plies, using tackifying stages, and/or creating a three-dimensional internal structure of a composite part. The methods 100 disclosed herein may be utilized in various aspects of composite manufacturing and the examples disclosed herein are not limiting.

Methods 100 may find application in various industries including the aerospace, automotive, marine, construction, and space manufacturing and repair industries, as well as any other industry where composite parts are manufactured and/or repaired. Methods 100 may be utilized to select or optimize such properties as mechanical properties, electrical properties, magnetic properties, optical properties, and thermal properties.

Specifically, as schematically represented in FIG. 1 and also with reference to the schematic examples of FIGS. 2-11 (discussed in greater detail below), methods 100 comprise generating (at 102) an electric field 202, encompassing (at 103) fibers 204 within the electric field 202 to orient the fibers 204 in a desired orientation relative to each other, and subsequent to the encompassing 103, fixing (at 106) the fibers 204 in the desired orientation within a matrix material 206 to at least partially create a composite part. In FIGS. 2-11, the fibers 204 are very schematically represented as elongate cylinders solely for the sake of illustration, and the fibers 204 are not limited to being cylindrical in shape.

As used herein, "fibers" 204, at least prior to performing the fixing 106, encompasses any suitable fiber-like material used to construct a fiber-reinforced composite structure according to methods 100, such as (but not limited to) one or more of dry fiber pieces (i.e., small (e.g., greatest dimension typically in the range of 5-20 mm) dielectric fibers not within a matrix material) or chopped fiber composite pieces. As used herein, "chopped fiber composite pieces" refers to a class of composite material often used in a compression molding process, in which the composite material is composed of numerous small (e.g., greatest dimension typically in the range of 5-20 mm) pieces, chips, flakes, sheets, and/or other structures having fiber pieces embedded in a dielectric matrix. Fiber pieces within chopped fiber composite pieces may be carbon fibers, graphite fibers, boron fibers, aramid fibers, glass fibers, metal fibers, wood or other natural fibers, and/or other materials. The dielectric matrix of chopped fiber composite pieces may be a thermoset plastic, a thermoplastic, a resin, an epoxy, and/or other materials and may be pre-cured, uncured, or partially cured prior to a composite part formation process.

Fibers 204 typically have a length that is longer than a dimension that is transverse or perpendicular to a length of the fibers 204 (e.g., diameter, width, thickness, and/or height). As illustrative, non-exclusive examples, fibers 204 may have a length that is at least two, at least three, at least five, or at least ten times greater than a diameter or a width of the fibers 204. Moreover, a fiber 204 may be described as having a long, or longitudinal, axis that is aligned with its length. Accordingly, the desired orientation of the fibers 204 that results from the encompassing 103 may be characterized in terms of the longitudinal axes of the fibers 204. For example, and as discussed in greater detail herein, a desired orientation may have the longitudinal axes of the fibers 204 generally aligned or parallel to each other. Other desired orientations also may result, as discussed herein.

The matrix material 206 may be any suitable material, such as selected for a specific application of the composite part, or portion thereof, being created according to a method 100. For example, the matrix material 206 may be a thermoset plastic, a thermoplastic, a resin, an epoxy, and/or other material. When chopped fiber composite pieces are used as the fibers 204, the matrix material 206 utilized in the fixing 106 may be the same as or different than the polymer of the chopped fiber composite pieces.

In some implementations of methods 100, the fibers 204 are dielectric. Accordingly, the fibers 204 may be well suited for being electrostatically polarized and thus being manipulated by the electric field 202 during the encompassing 103.

In other implementations of methods 100, the fibers 204 are electrically conductive. Such fibers may be selected for a particular application of the composite part, or portion thereof, being created according to a method 100. For example, in some aerospace or other applications, it may be desirable to utilize electrically conductive fibers to facilitate the dispersal of a lightning strike on a component. Additionally or alternatively, use of electrically conductive fibers in a composite part may facilitate the absorption and/or reduction of reflection of radar, infrared, and/or sonar signals that are incident on the composite part. Other applications for electrically conductive fibers also exist.

In some implementations of methods 100, the fibers 204 themselves comprise a composite material, such as with each of the fibers 204 comprising reinforcing structure (e.g., carbon fibers, boron fibers, aramid fibers, glass fibers, wood or other natural fibers, and/or other materials) within a matrix (e.g., a polymer). Chopped fiber composite pieces, discussed above, are examples of such fibers 204. In some of such examples, the matrix of the composite material is dielectric, and therefore is well suited for being electrostatically polarized and thus being manipulated by the electric field 202 during the encompassing 103. In some examples, in which the fibers 204 comprise a composite material, the reinforcing structure additionally or alternatively is dielectric, and thus facilitates being electrostatically polarized and manipulated by the electric field 202 during the encompassing 103. In other examples, the reinforcing structure is electrically conductive while the matrix is dielectric.

With continued reference to FIG. 1, some methods 100 further comprise, prior to the encompassing 103, electrostatically polarizing (at 108) the fibers 204. In such implementations of methods 100, the electrostatically polarizing 108 facilitates the subsequent manipulation of the fibers 204 by the electric field 202. That is, by electrostatically polarizing the fibers 204 prior to being encompassed by the electric field 202, the dipole moments of the fibers 204 are increased, which results in enhanced alignment of the fibers 204 with the electric field 202 during the encompassing 103.

That said, electrostatically polarizing 108 is not required in all implementations of methods 100, and simply encompassing the fibers 204 within the electric field 202 may impart a polarization to the fibers 204, depending on the dielectric properties of the fibers 204.

Figure 2:
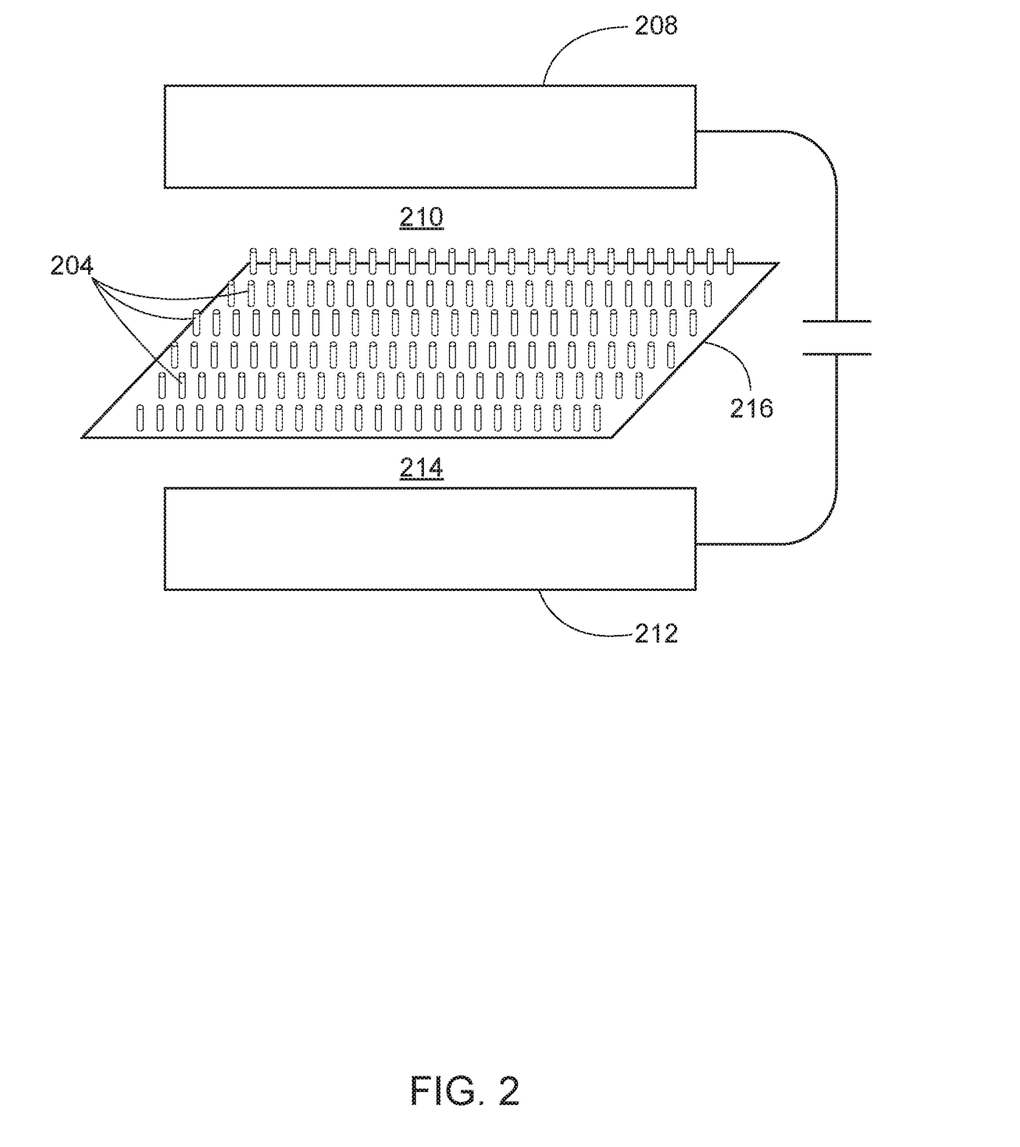
FIG. 2 schematically illustrates an example of electrostatically polarizing fibers.

With reference to FIGS. 1 and 2, in some implementations of methods 100, the electrostatically polarizing 108 comprises positioning (at 110) a first structure 208 on a first side 210 of the fibers 204 and a second structure 212 on a second side 214 of the fibers 204 that is opposite the first side 210, and applying (at 112) a voltage across the first structure 208 and the second structure 212 sufficient to electrostatically polarize the fibers 204. In FIG. 2, the fibers 204 are schematically represented as being supported by a support structure 216; however, the fibers 204 may be supported directly on whichever is lower of the first and second structures 208, 212. Depending on the material of the fibers 204 and the environment in which the electrostatically polarizing 108 is performed, the voltage applied may be in the tens of thousands of volts. The first and second structures 208, 212 may take any suitable form to adequately perform the electrostatically polarizing 108, such as, but not limited to, conductive plates.

In FIGS. 3-6, the electric field 202 is schematically represented by a series of dashed arrows. In some implementations of methods 100, the electric field 202 is a pulsed electric field. In such examples, the pulsed electric field may assist in overcoming any friction between neighboring fibers 204, between the fibers 204 and the environment in which the fibers 204 are supported, and/or between the fibers 204 and any structure on which the fibers 204 are supported. In other implementations of methods 100, the electric field 202 is a static electric field.

Due to the polarization of the fibers 204, whether via the optional step of electrostatically polarizing 108 or simply by being encompassed within the electric field 202, when the fibers 204 are within the electric field 202, the longitudinal axes of the fibers 204 align with the electric field 202, such as schematically represented in FIGS. 3B-3D, 4B-4C, and 5A.

With continued reference to FIG. 1, in some implementations of methods 100, the encompassing 103 comprises moving (104) the electric field 202 relative to the fibers 204 so that the electric field 202 encompasses at least some of the fibers 204 to orient the fibers 204 in the desired orientation. Herein, "moving the electric field relative to the fibers" encompasses implementations (i) in which the fibers 204 physically are moved in space while the electric field 202 is not moved, (ii) in which the electric field 202 is physically moved in space while the fibers 204 are not moved (other than as a result of their interaction with electric field 202 and gravity), and (iii) in which the fibers 204 and the electric field 202 are moved in space relative to each other.

With continued reference to FIG. 1, as well as to the example implementation of FIGS. 3-6, in some of such implementations of methods 100, the moving 104 comprises producing (at 114) the electric field 202 between two spaced-apart electrodes 218, and moving (at 116) one or both of the electrodes 218 relative to the fibers 204. Such moving 116 encompasses implementations (i) in which the fibers 204 physically are moved in space while the electrodes 218 are not moved, (ii) in which the electrodes 218 are physically moved in space while the fibers 204 are not moved (other than as a result of their interaction with electric field 202 and gravity), and (iii) in which the fibers 204 and the electrodes 218 are moved in space relative to each other. In some implementations of methods 100, the moving 104 further comprises removing (at 118) the fibers 204 from within the electric field 202, such that gravity causes the fibers 204 to lay-down on a surface in the desired orientation.

Figure 3A:
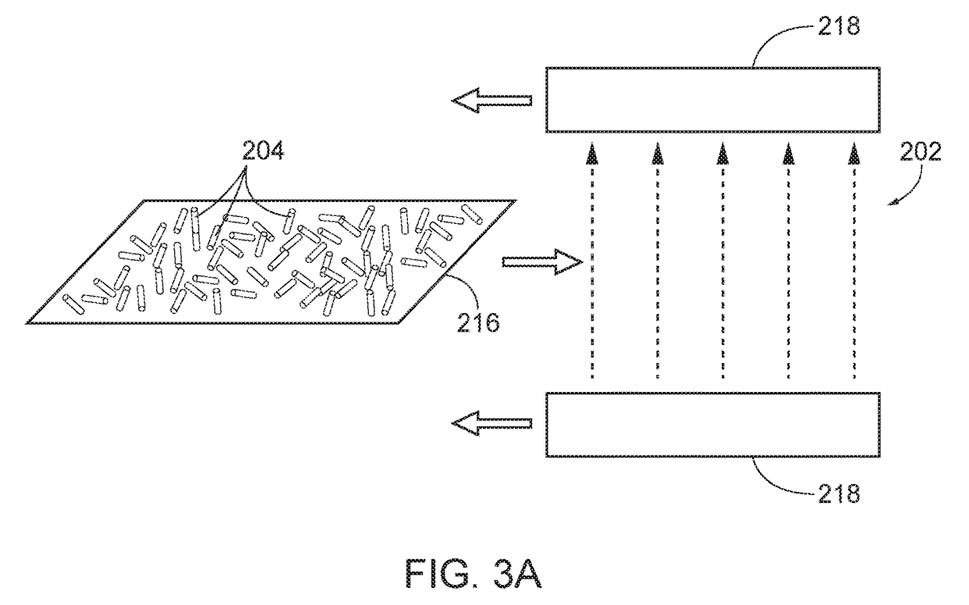
FIGS. 3A-3E schematically illustrate an example method according to the present disclosure.
Figure 3B:
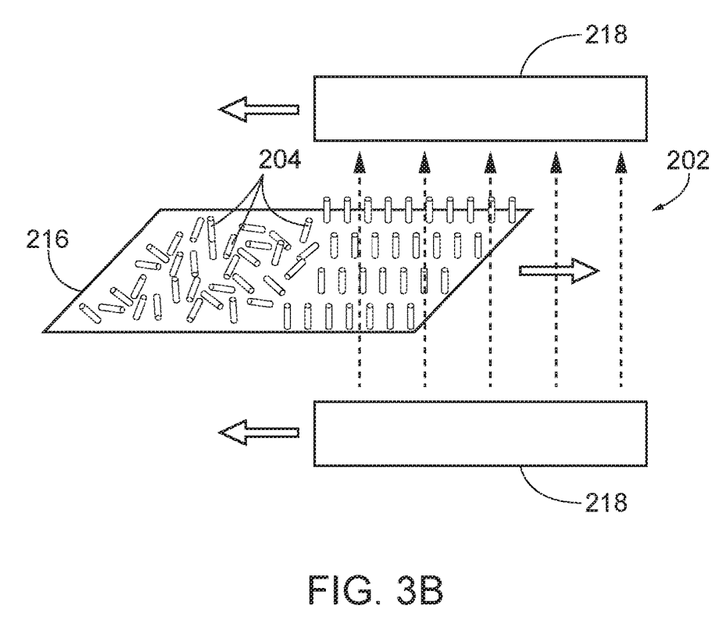
Figure 3C:
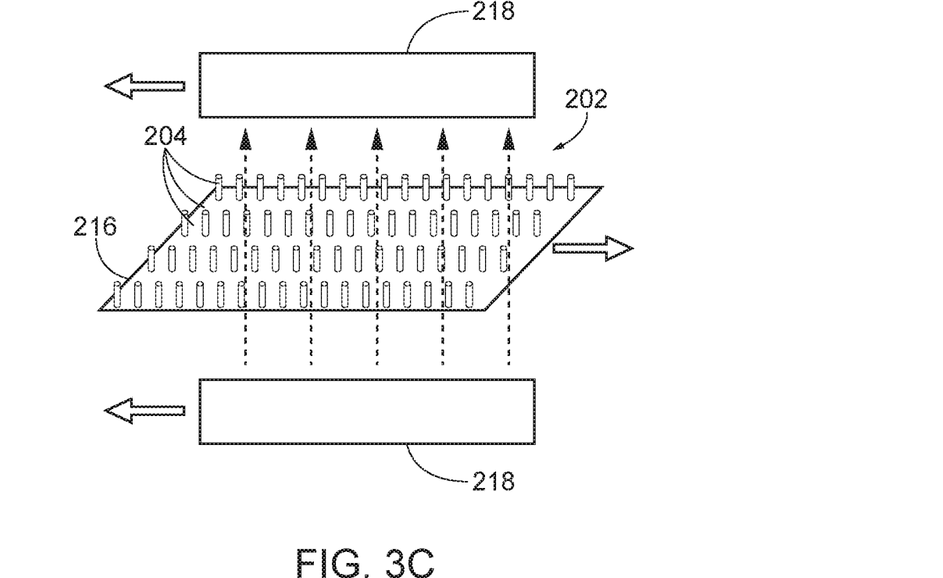
Figure 3D:
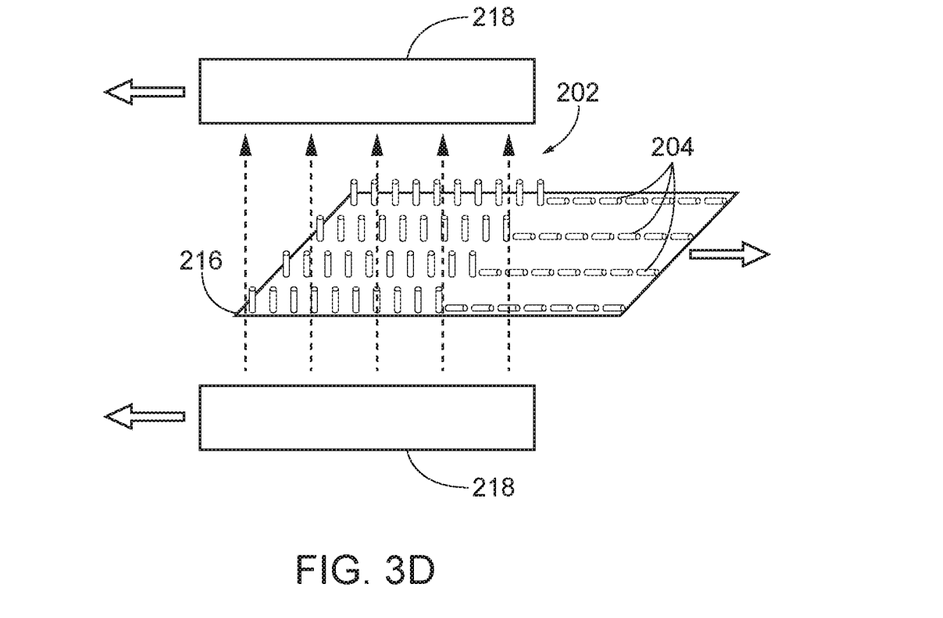
Figure 3E:
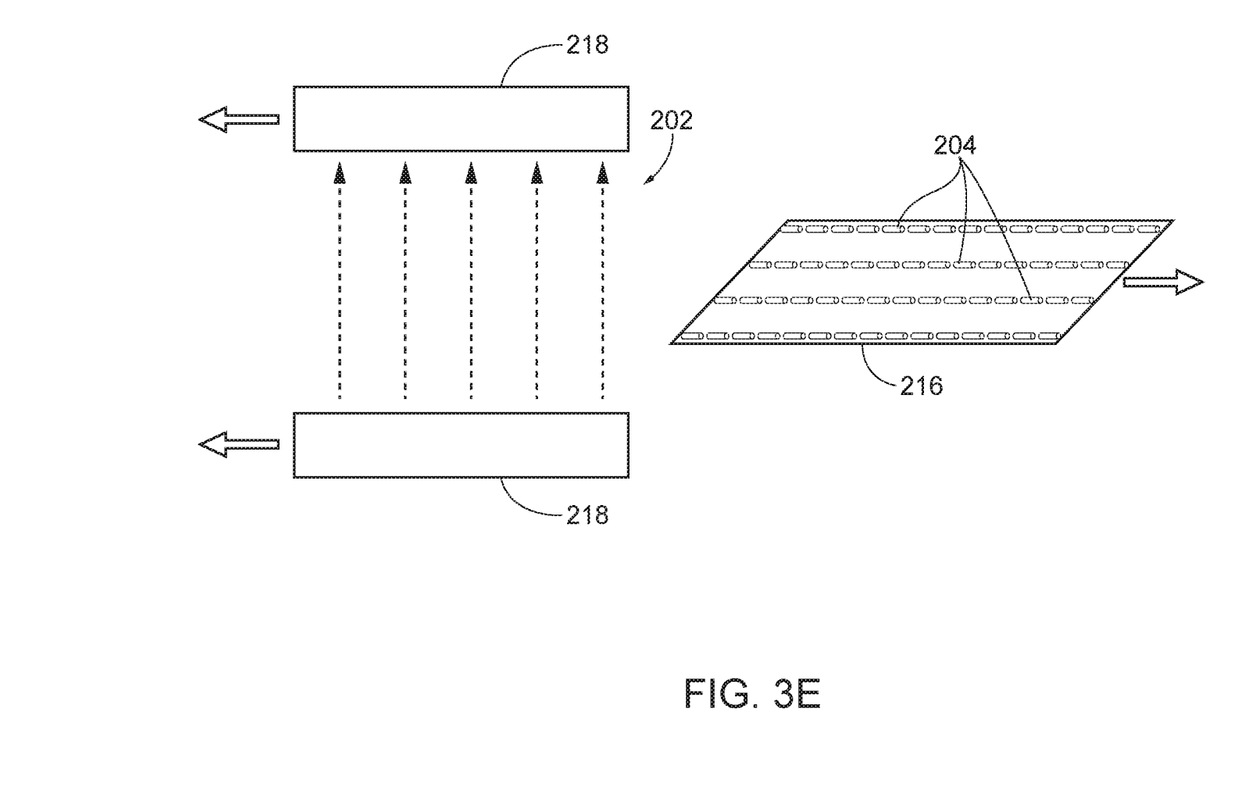

FIGS. 3A-3E schematically illustrate an example implementation in which the moving 116 comprises moving the electrodes 218 in the same direction relative to the fibers 204. More specifically, as seen in FIG. 3A, the fibers 204 are first supported on a support structure 216, with the fibers 204 being randomly oriented. In FIGS. 3B-3C, the fibers 204 are being brought into and partially encompassed by the electric field 202, which causes the longitudinal axes of the fibers 204 to align with the electric field 202. Then, as seen in FIG. 3D-3E, as the fibers 204 are removed from the electric field 202, the fibers 204 lay-down on the support structure 216 with their longitudinal axes generally aligned as a result of gravity and the effect of the edge of the electric field 202 as the fibers 204 exit the electric field 202.

Figure 4A:
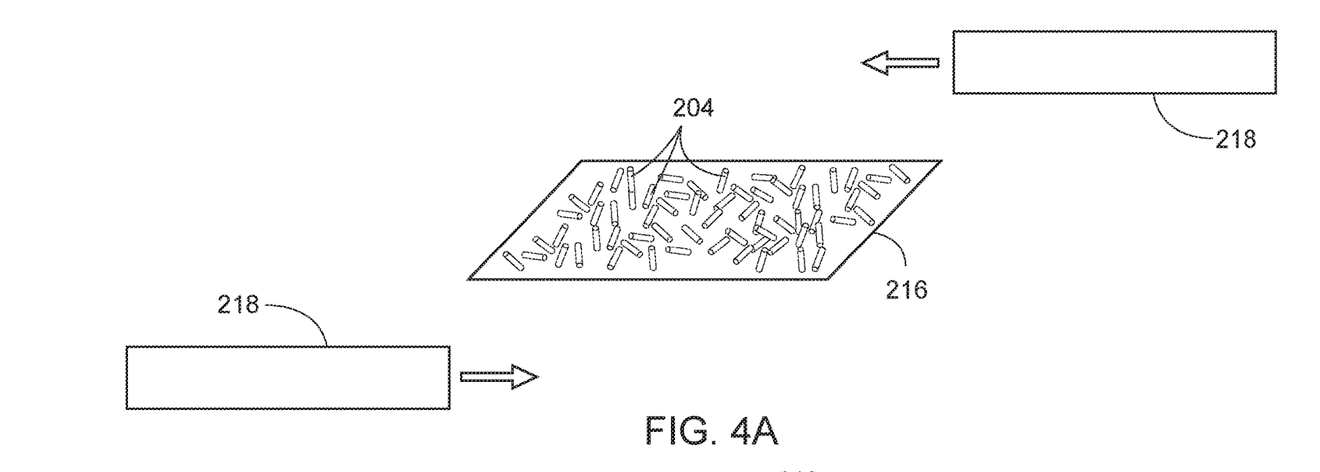
FIGS. 4A-4D schematically illustrate an example method according to the present disclosure.
Figure 4B:
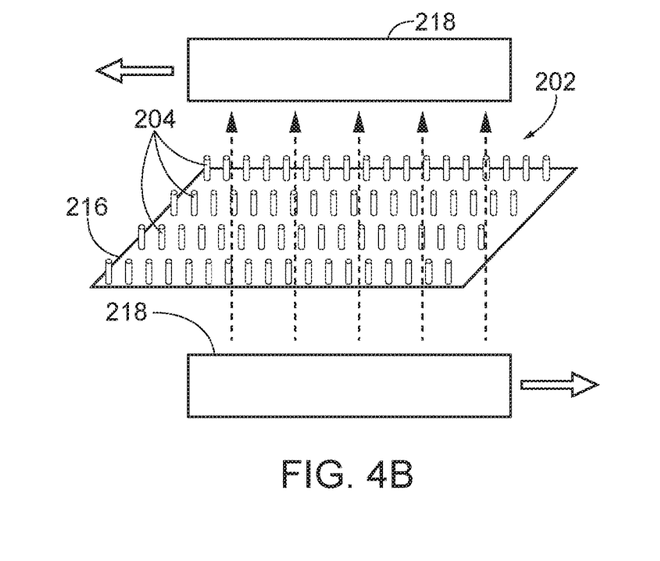
Figure 4C:
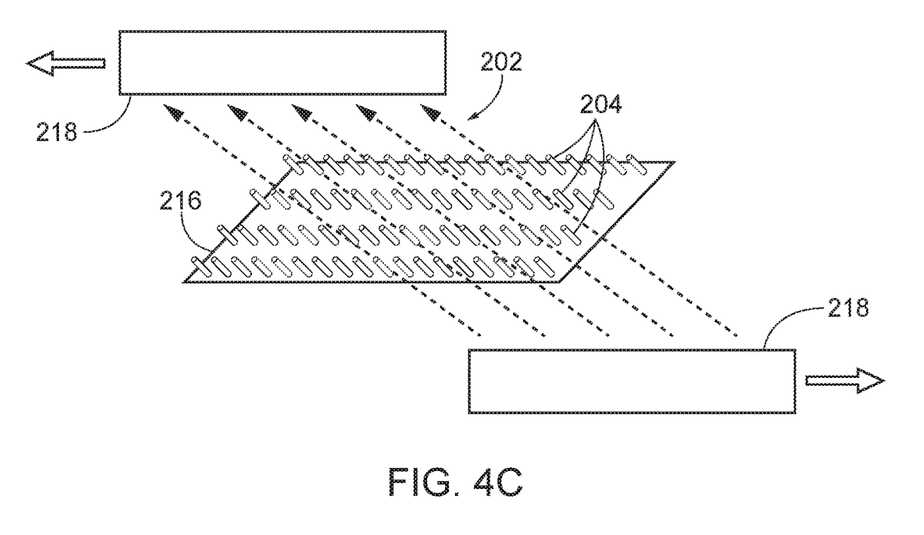
Figure 4D:
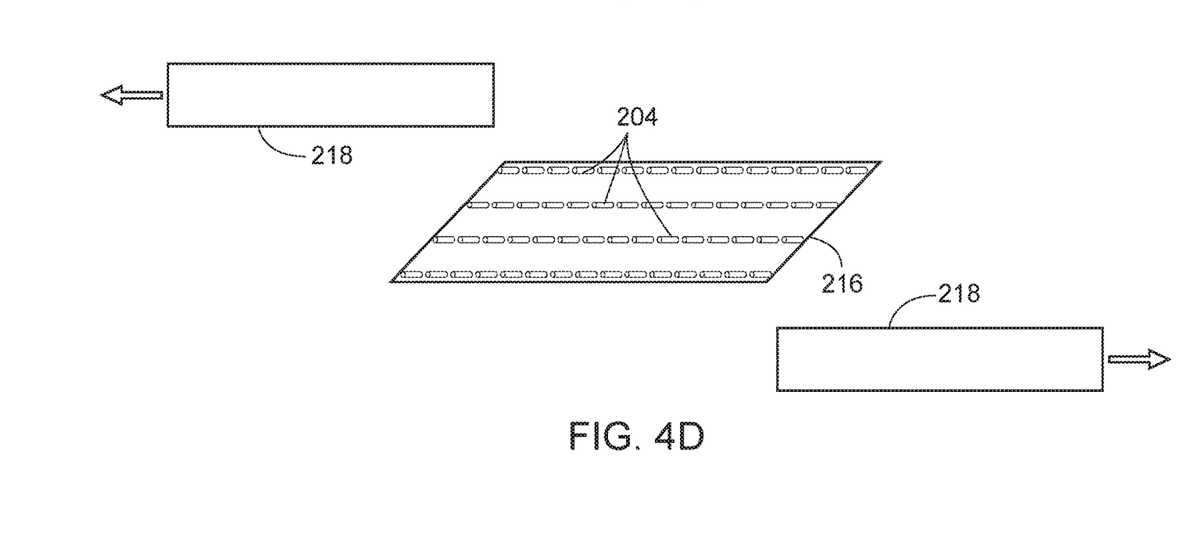

FIGS. 4A-4D schematically illustrate an example implementation in which the moving 116 comprises moving the electrodes 218 in different directions relative to the fibers 204, and more specifically in which the electrodes 218 are moved in opposite directions relative to the fibers 204. As seen in FIG. 4A, the fibers 204 are first supported on a support structure 216, with the fibers 204 being randomly oriented. In FIG. 4B, the fibers 204 have been brought into and encompassed by the electric field 202, which causes the longitudinal axes of the fibers 204 to align with the electric field 202. Then, as seen in FIG. 4C-4D, as the fibers 204 are removed from the electric field 202, the fibers 204 lay-down on the support structure 216 with their longitudinal axes generally aligned as a result of gravity and the change in direction of the electric field 202 as the electrodes 218 move away from each other and the fibers 204 exit the electric field 202.

In the schematic examples of FIGS. 3-4, the entirety of the fibers 204 present are encompassed by the electric field 202, resulting in all of the fibers 204 being parallel or generally parallel to each other in the desired orientation. However, also within the scope of methods 100 are implementations in which, in the desired orientation, the fibers 204 are in a non-uniform orientation. For example, in some such implementations, in the non-uniform orientation, some of the fibers 204 are parallel or generally parallel to each other and are not parallel or generally parallel to others of the fibers 204.

Figure 5A:
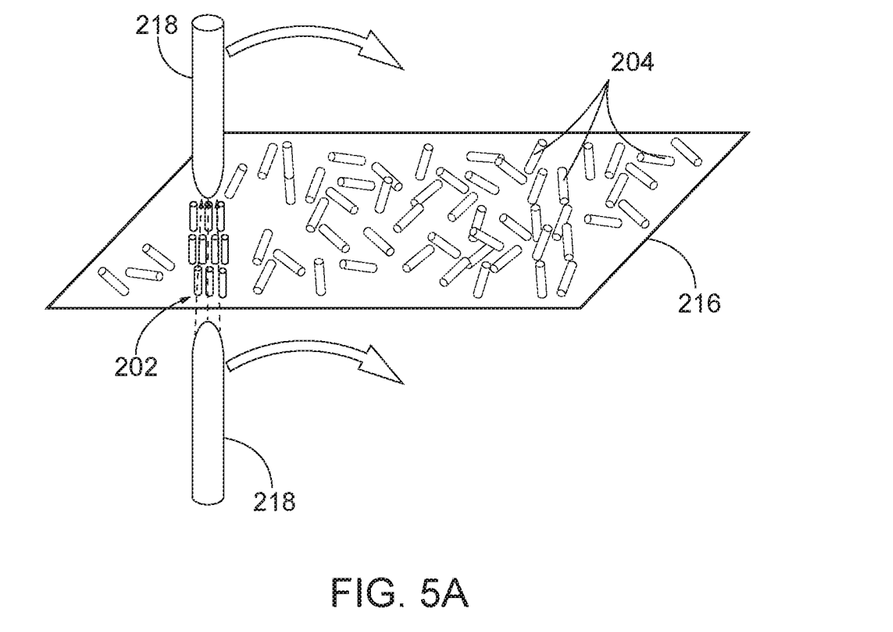
FIGS. 5A-5B schematically illustrate an example method according to the present disclosure.
Figure 5B:
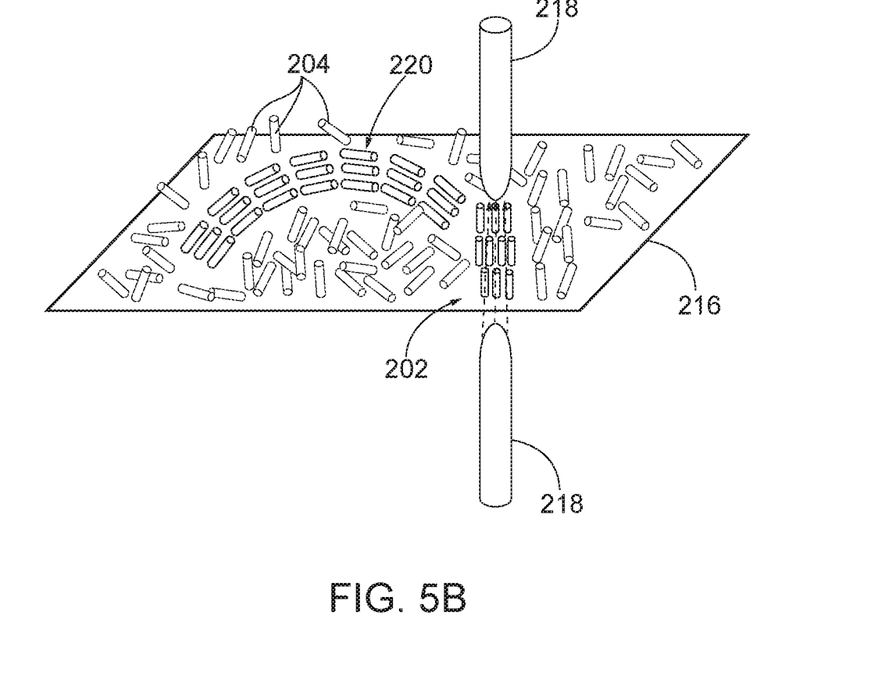

FIGS. 5A-5B schematically illustrate such an example implementation in which the moving 116 of the electrodes 218 relative to the fibers 204 results in an overall non-uniform orientation of the fibers, but with subsets of the fibers 204 being in uniform orientations. More specifically, as schematically represented in FIGS. 5A-5B, the electric field 202 generated by the electrodes 218 does not fully encompass all of the fibers 204 supported by the support structure 216. As a result, when the electrodes 218 move relative to the fibers 204, only those fibers 204 that are encompassed by the electric field 202 become aligned with the electric field and lay-down on the support structure 216 with their longitudinal axes generally aligned as a result of gravity and the effect of the edge of the electric field 202 as the fibers 204 exit the electric field 202. Accordingly, such an implementation can create a path 220 of aligned fibers 204, which may be beneficial in various applications, such as when the fibers 204 include an electrically conductive component to them. Additionally or alternatively, aligning the fibers along a path may create desired physical properties associated with the composite part being created according to a method 100. Additionally or alternatively, aligning the fibers 204 along a path may facilitate subsequent work on the part, such as cutting, breaking, or drilling.

With reference to FIGS. 6A-6C and 7A-7C, in some implementations of methods 100, the encompassing 103 comprises moving a statically charged structure 228 relative to the fibers 204 to encompass the fibers in a static electric field to orient the fibers 204 in the desired orientation. In the example implementation of FIGS. 6A-6C, the statically charged structure 228 is in the form of a cylindrical rod that moves longitudinally relative to the fibers 204 to create a path 220 of aligned fibers 204. In the example implementation of FIGS. 7A-7C, the statically charged structure 228 also is in the form of a cylindrical rod; however, in the example of FIGS. 7A-7C, the cylindrical rod moves toward and then away from the fibers 204 to create a path 220 of aligned fibers 204. In both examples, the statically charged structure 228 is smaller than a span of the fibers, such that with the illustrated example relative movements, only a subset of the fibers 204 will be encompassed by the electric field. However, other implementations of methods 100 may include relative movement between the statically charged structure 228 and the fibers 204, in which all of the fibers 204 ultimately are encompassed by the electric field 202. Moreover, the statically charged structure 228 may take any suitable shape and configuration to result in the desired orientation of the fibers 204.

Figure 6A:
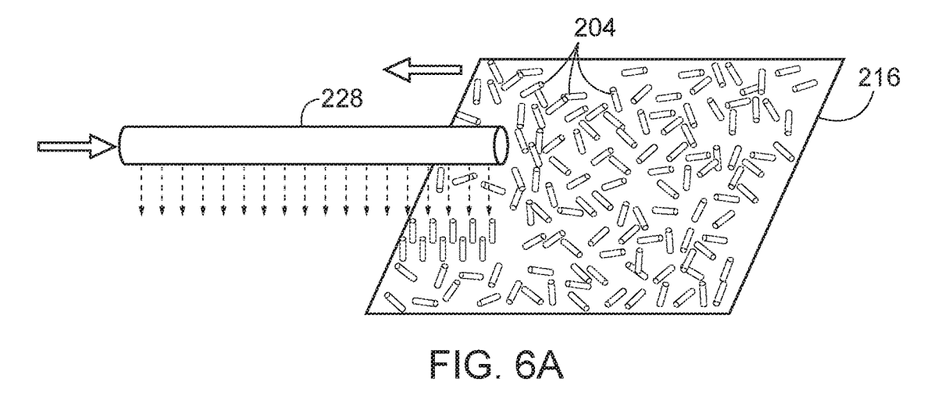
FIGS. 6A-6C schematically illustrate an example method according to the present disclosure.
Figure 6B:
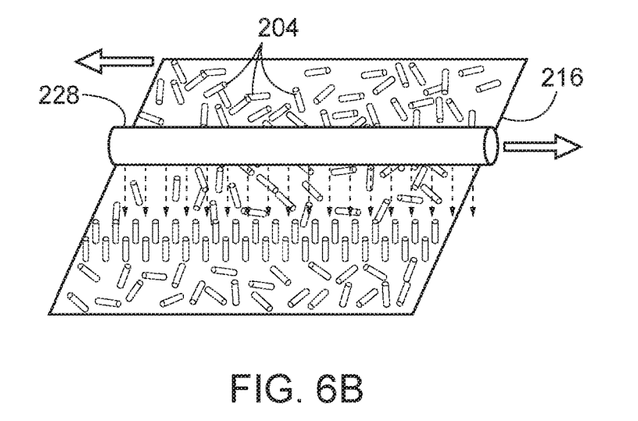
Figure 6C:
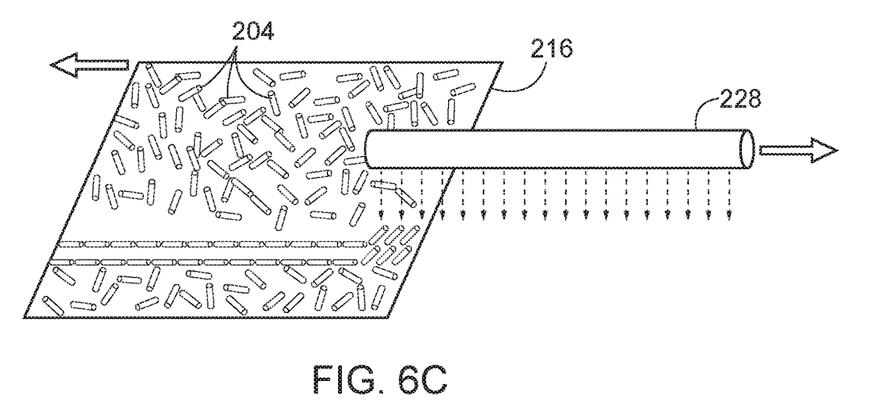
Figure 7A:
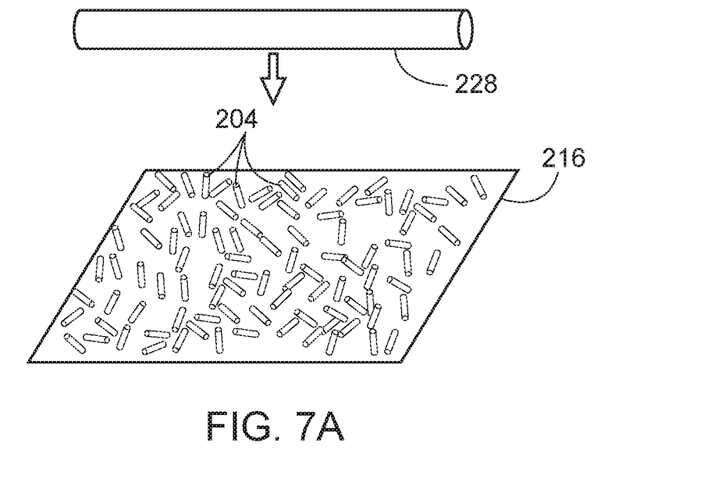
FIGS. 7A-7C schematically illustrate an example method according to the present disclosure.
Figure 7B:
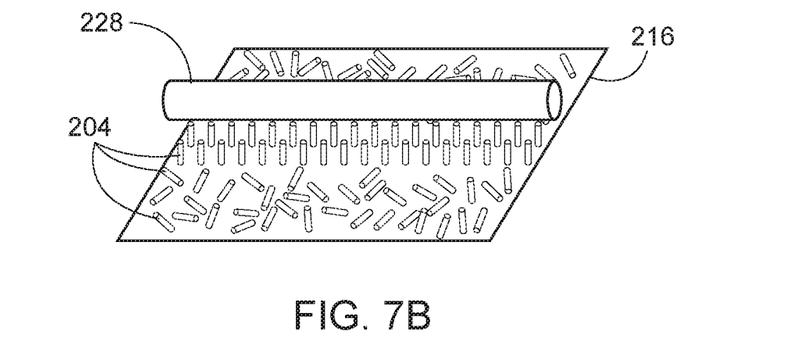
Figure 7C:
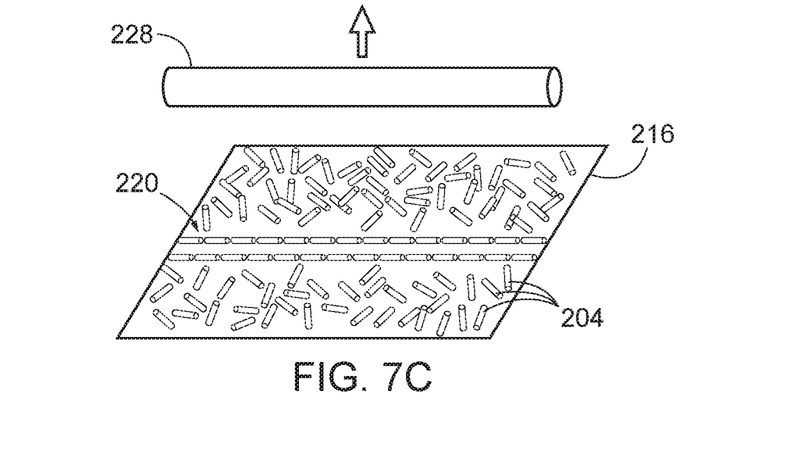
Figure 8:
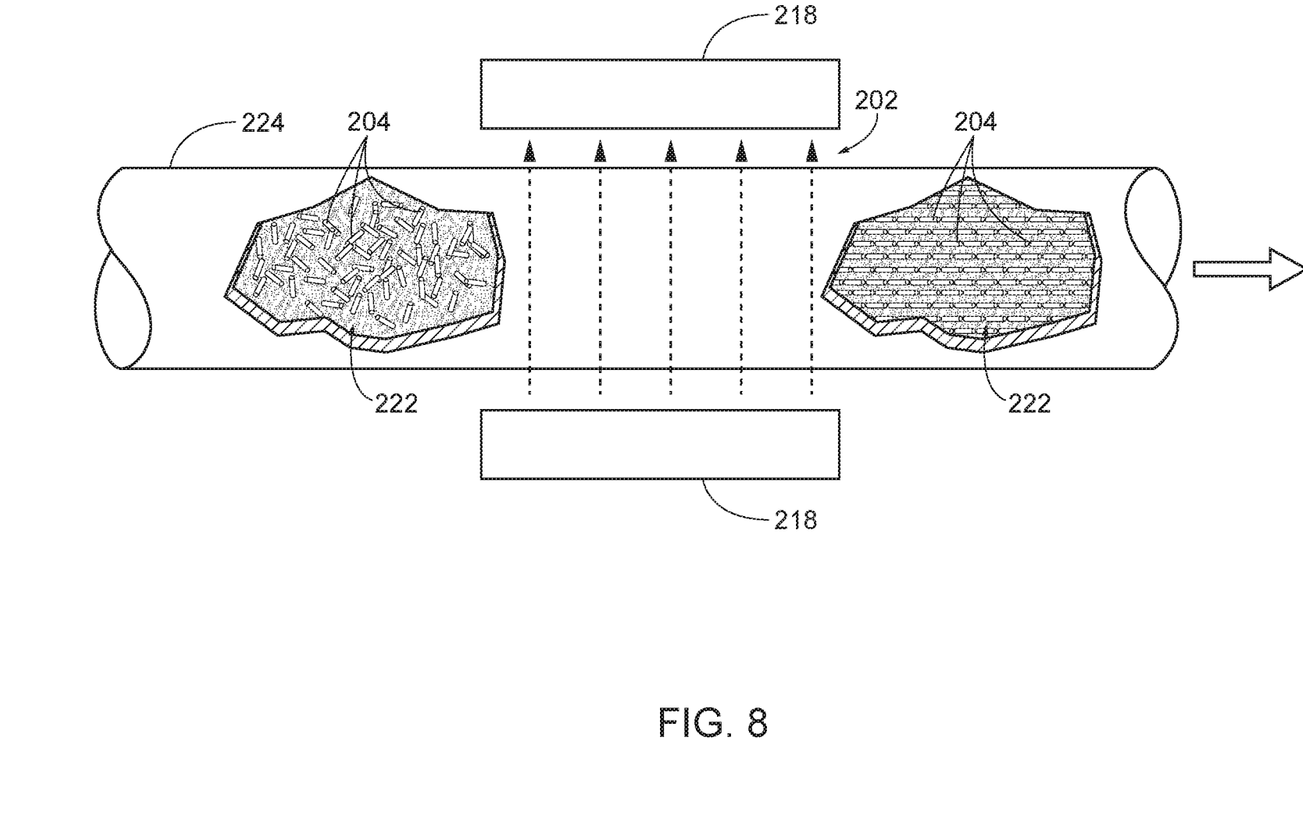
FIG. 8 schematically illustrates an example method according to the present disclosure.

In some implementations of methods 100, during the encompassing 103 (and during the optional moving 104), the fibers 204 are within a gas environment, such as in air, with FIGS. 3-5 providing examples of such implementations. In some such examples, a gas may be flowed across the fibers 204 to aid in the laying down of the fibers 204 in the desired orientation as they are removed from the electric field 202. In other implementations of methods 100, during the encompassing 103 (and during the optional moving 104), the fibers 204 are within a flowing slurry 222. That is, the fibers 204 are within a flowing liquid, such as a resin (e.g., during an injection molding process). In some such implementations, the slurry 222 comprises a molten material, such as that will become the matrix material 206 of the composite part being formed. FIG. 6 schematically illustrates an example in which the fibers 204 are within a flowing slurry 222. As seen in FIG. 6, the slurry 222 flows through a conduit 224, with an electric field 202 (e.g., generated between two electrodes 218) encompassing at least a portion of the conduit 224. Accordingly, as the slurry 222 passes through the electric field 202, the fibers 204 within the slurry 222 will first align within the electric field 202 and then, as the fibers 204 exit the electric field 202, the fibers 204 will align with the direction of flow of the slurry 222. Such implementations of methods 100 may be well suited for creating elongate composite structures with fibers 204 aligned with the longitudinal axes of the elongate composite structures and/or as part of an injection molding process. Moreover, such implementations of methods 100 may be used during a fiber-reinforced resin injection method, in with the orientation of the fibers 204 are manipulated externally.

Figure 11:
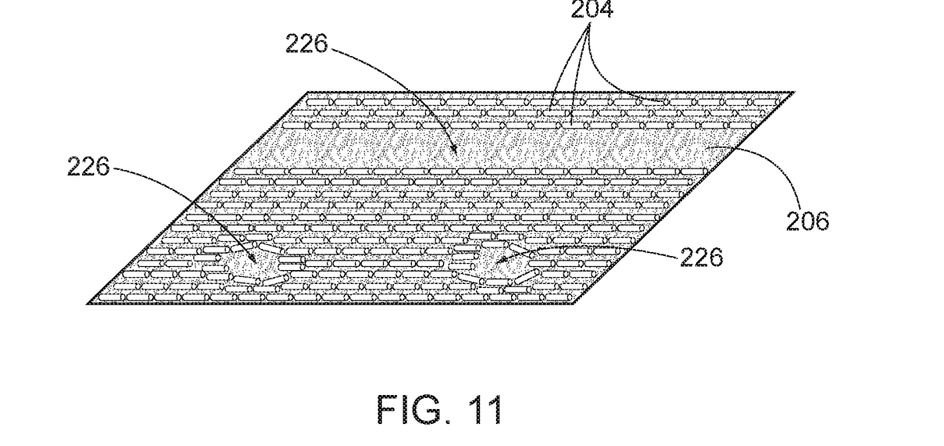
FIG. 11 schematically illustrates the results of additional example methods according to the present disclosure.

In some implementations of methods 100, in the desired orientation, voids 226 are present within regions of the fibers 204, or in other words, the fibers in the desired orientation are arranged in regions that define one or more voids 226. FIG. 11 schematically represents illustrative, non-exclusive examples of voids 226 within regions of the fibers 204. As used herein, a "void" is a region of the matrix material 206 having a greatest linear dimension that is at least twice the length (or average length) of the fibers 204, in which the fibers 204 are not present. In FIG. 11, two generally circular voids 226 and one generally linear void 226 are schematically represented, but voids 226 may take any suitable size and shape depending on a particular application of the voids 226. As illustrative, non-exclusive examples, voids 226 may be created such that the composite part comprises one or more of a score line, a fracture point, or a drill hole location associated with a void 226 and thus with the desired orientation. For example, by creating voids 226, subsequent work on the composite part (e.g., cutting, breaking, or drilling) may avoid cutting of reinforcing fibers and thus may result in easier and cleaner working of the composite part. Additionally or alternatively, such subsequent working of the composite part may avoid or at least reduce stress concentrations in the composite part. Additionally or alternatively, in some implementations of methods 100, the composite part comprises a radius associated with the desired orientation. For example, a void 226 that defines a drill hole location may be described as being associated with a radius of the drill hole. In other examples, the fibers 204 may be preferentially oriented to generally conform to a rounded corner of a structure, for example.

In some implementations of methods 100, the desired orientation of the fibers 204 imparts uniform material properties to the composite part. In other implementations of methods 100, the desired orientation of the fibers 204 imparts non-uniform material properties to the composite part. Such material properties may comprise one or more of mechanical properties, electrical properties, magnetic properties, optical properties, and thermal properties, such as depending on the material selected for the fibers 204 and the matrix material 206.

Turning back to FIG. 1, in some implementations of methods 100, the fixing 106 comprises applying (at 120) a tackifier to the fibers 204, with the tackifier comprising the matrix material 206. A tackifier may be applied in any suitable manner, including spraying or dripping a liquid tackifier onto the fibers 204 to encompass the fibers 204 within the matrix material 206. Additionally or alternatively, in some implementations of methods 100, the fixing 106 comprises applying (at 122) a tape to the fibers 204, with the tape comprising the matrix material 206. Additionally or alternatively, in some implementations of methods 100, the fixing 106 comprises compacting (at 124) the composite part. Additionally or alternatively, in some implementations of methods 100, the fixing 106 comprises at least partially curing (at 126) the composite part.

Figure 9:
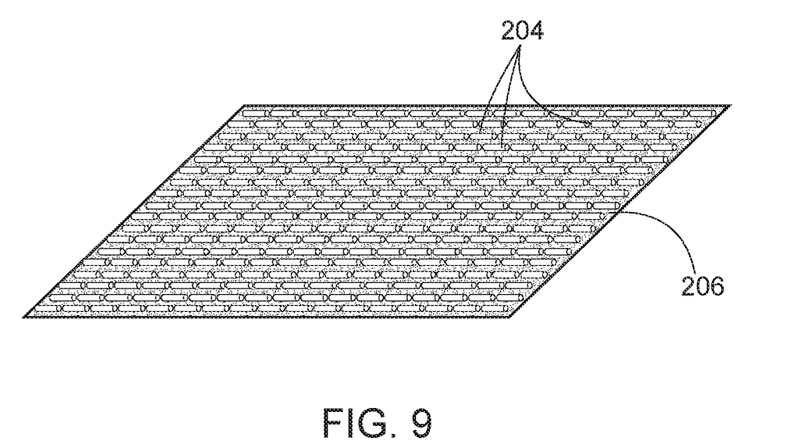
FIG. 9 schematically illustrates the result of an example method according to the present disclosure.
Figure 10:
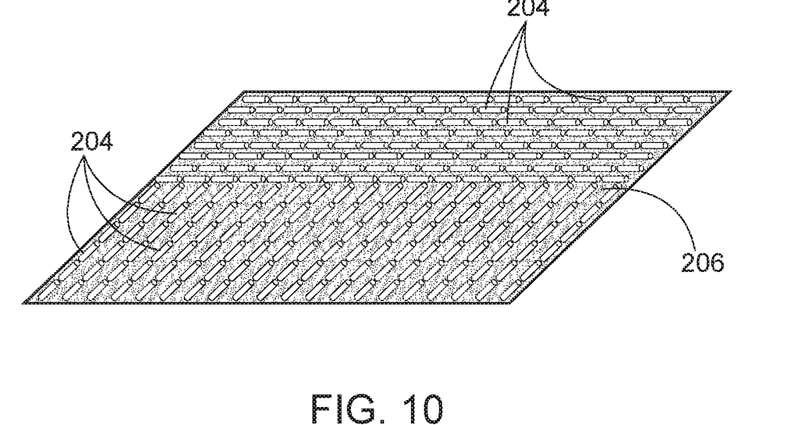
FIG. 10 schematically illustrates the result of another example method according to the present disclosure.

FIGS. 9-11 schematically illustrate non-exclusive examples of desired orientations of fibers 204 following the fixing 106. In FIG. 9, all of the fibers 204 are aligned or generally aligned with each other. In FIG. 10, the fibers 204 of a first subset of the fibers 204 are aligned or generally aligned with each other, and the fibers 204 of a second subset of the fibers 204 are aligned or generally aligned with each other and are transverse to the first subset. In FIG. 11, as discussed above, three example voids 226 are present.

In some implementations of methods 100, the fixing 106 creates a ply of composite material, that is, a sheet or film of composite material in which the length and width is significantly greater than the thickness or depth of the composite material. With reference again to FIG. 1, some such implementations, methods 100 further comprise repeating (at 128) at least the generating 102, the moving 104, and the fixing 106, and optionally the electrostatically polarizing 108, to create one or more additional plies of composite material, and then stacking (at 130) the plies of composite material.

In some such implementations of methods 100, as indicated in FIG. 1, the stacking 130 comprises orienting (at 132) the fibers 204 of the one or more additional plies of composite material transverse to the fibers 204 of the first ply of composite material. For example, plies, as in the example of FIG. 9, each may have aligned fibers 204, and the plies may be stacked such that the fibers 204 are sequentially oriented at desired angles relative to each other (e.g., in a 0°, 45°, 90°, and 135° pattern). Other patterns of relative angles may be selected for particular applications and desired resulting properties of the composite part being created.

A resulting structure of stacked plies may be described as a lay-up of composite plies, which then may be used in a downstream method of creating a greater composite part according to known techniques.

Additionally or alternatively, an implementation of a method 100 may result in a ply of composite material, in which the fibers 204 are oriented out-of-plane of the ply, that is, with the long axes of at least a subset of the fibers 204 being transverse, or oblique, to the plane of the ply. When such a ply or plies are subsequently stacked with one or more additional plies, the out-of-plane fibers 204 may reduce delamination, that is, may increase the cohesion between adjacent plies.

In some implementations of methods 100, the moving 104 is performed while the fibers 204 are within a viscous material of an at least partially assembled composite assembly, that is, with the matrix material 206 being in a viscous state. For example, and as indicated in FIG. 1, some methods 100 further comprise curing (at 134) the at least partially assembled composite assembly, such that the moving 104 is performed concurrently with the curing 134, and the viscous material is viscous as a result of the curing 134. For example, the moving 104 may be performed while the at least partially assembled composite assembly is being cured in an autoclave, during which time the matrix material 206 is sufficiently viscous to permit the manipulation of the orientation of the fibers 204 within the matrix material 206 as a result of the movement of the electric field 202.

Illustrative, non-exclusive examples of inventive subject matter according to the present disclosure are described in the following enumerated paragraphs:

A. A method, comprising:
generating an electric field;
encompassing fibers within the electric field to orient the fibers in a desired orientation relative to each other; and
subsequent to the encompassing, fixing the fibers in the desired orientation within a matrix material to at least partially create a composite part.

A1. The method of paragraph A, wherein the fibers comprise chopped fiber composite pieces.

A2. The method of any of paragraphs A-A1, wherein the fibers are dielectric.

A3. The method of any of paragraphs A-A2, wherein the fibers comprise a composite material.

A4. The method of any of paragraphs A-A3, wherein each of the fibers comprises reinforcing structure within a matrix.

A4.1. The method of paragraph A4, wherein the matrix is dielectric.

A4.2. The method of any of paragraphs A4-A4.1, wherein the reinforcing structure is dielectric.

A4.3. The method of any of paragraphs A4-A4.1, wherein the reinforcing structure is electrically conductive.

A5. The method of any of paragraphs A-A4.3, further comprising, prior to the encompassing, electrostatically polarizing the fibers.

A5.1. The method of paragraph A5, wherein the electrostatically polarizing comprises:
positioning a first structure on a first side of the fibers and a second structure on a second side of the fibers that is opposite the first side; and
applying a voltage across the first structure and the second structure sufficient to electrostatically polarize the fibers.

A6. The method of any of paragraphs A-A5.1, wherein the electric field is a pulsed electric field.

A7. The method of any of paragraphs A-A5.1, wherein the electric field is a static electric field.

A8. The method of any of paragraphs A-A7, wherein when the fibers are within the electric field, longitudinal axes of the fibers align with the electric field.

A9. The method of any of paragraphs A-A8, wherein the encompassing comprises moving the electric field relative to the fibers from a configuration in which none of the fibers are encompassed by the electric field to a configuration in which the electric field encompasses at least some of the fibers to orient the fibers in the desired orientation.

A9.1. The method of paragraph A9, wherein the moving the electric field relative to the fibers comprises:
producing the electric field between two spaced-apart electrodes; and
moving one or both of the electrodes relative to the fibers.

A9.1.1. The method of paragraph A9.1, wherein the moving one or both of the electrodes comprises moving the electrodes in opposite directions relative to the fibers.

A9.1.2. The method of any of paragraphs A9.1-A9.1.1, wherein the moving one or both of the electrodes comprises moving the electrodes in different directions relative to the fibers.

A9.1.3. The method of any of paragraphs A9.1-A9.1.1, wherein the moving one or both of the electrodes comprises moving the electrodes in the same direction relative to the fibers.

A9.2. The method of any of paragraphs A9-A9.1.3, wherein the encompassing further comprises removing the at least some of the fibers from the electric field, such that gravity causes the at least some of the fibers to lay-down on a surface in the desired orientation.

A10. The method of any of paragraphs A-A9.2, wherein in the desired orientation, all of the fibers are parallel or generally parallel to each other.

A11. The method of any of paragraphs A-A9.2, wherein in the desired orientation, the fibers are in a non-uniform orientation.

A11.1. The method of paragraph A11, wherein in the non-uniform orientation, some of the fibers are parallel or generally parallel to each other and are not parallel or generally parallel to others of the fibers.

A12. The method of any of paragraphs A-A11.1, wherein in the desired orientation, voids are present within regions of the fibers.

A13. The method of any of paragraphs A-A12, wherein the desired orientation imparts uniform material properties to the composite part.

A14. The method of any of paragraphs A-A12, wherein the desired orientation imparts non-uniform material properties to the composite part.

A15. The method of any of paragraphs A13-A14, wherein the material properties comprise one or more of mechanical properties, electrical properties, magnetic properties, optical properties, and thermal properties.

A16. The method of any of paragraphs A-A15, wherein the composite part comprises one or more of a score line, a fracture point, a drill hole location, or a radius associated with the desired orientation.

A17. The method of any of paragraphs A-A16, wherein during the encompassing, the fibers are within a slurry.

A18. The method of any of paragraphs A-A16, wherein during the encompassing, the fibers are within a gas environment.

A19. The method of any of paragraphs A-A18, wherein the fixing comprises applying a tackifier to the fibers, and wherein the tackifier comprises the matrix material.

A20. The method of any of paragraphs A-A19, wherein the fixing comprises applying a tape to the fibers, and wherein the tape comprises the matrix material.

A21. The method of any of paragraphs A-A20, wherein the fixing comprises compacting the composite part.

A22. The method of any of paragraphs A-A21, wherein the fixing comprises at least partially curing the composite part.

A23. The method of any of paragraphs A-A22,
wherein the fixing creates a first ply of composite material; and
wherein the method further comprises:
repeating the generating, the encompassing, and the fixing with respect to new fibers to create one or more additional plies of composite material; and
stacking the first ply of composite material with the one or more additional plies of composite material.

A23.1. The method of paragraph A23, wherein the stacking comprises orienting the fibers of the one or more additional plies of composite material transverse to the fibers of the first ply of composite material.

A24. The method of any of paragraphs A-A22, wherein the encompassing is performed while the fibers are within a viscous material of an at least partially assembled composite assembly, wherein the viscous material comprises the matrix material.

A24.1. The method of paragraph A24, further comprising curing the at least partially assembled composite assembly, wherein the encompassing is performed concurrently with the curing, and wherein the viscous material is viscous as a result of the curing.

A25. The composite part at least partially created according to the method of any of paragraphs A-A24.1.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method, comprising:
supporting fibers on a support structure;
generating an electric field between an upper electrode positioned above the support structure and a lower electrode positioned below the support structure directly opposite the upper electrode, wherein the electric field encompasses less that an entirety of the support structure;
encompassing less than all of the fibers supported on the support structure within the electric field, wherein the encompassing comprises moving the upper electrode and the lower electrode in tandem relative to the support structure, wherein the moving comprises removing fibers from within the electric field, such that gravity causes the removed fibers to lay down on the support structure along a path of aligned fibers within regions of non-aligned fibers; and
subsequent to the encompassing, fixing the fibers in a desired orientation comprising the path within a matrix material to at least partially create a composite part.

2. The method of claim 1, wherein the fibers comprise chopped fiber composite pieces.

3. The method of claim 1, wherein the fibers are dielectric.

4. The method of claim 1, wherein each of the fibers comprises a reinforcing structure within a dielectric matrix.

5. The method of claim 4, wherein the reinforcing structure is electrically conductive.

6. The method of claim 1, further comprising, prior to the encompassing, electrostatically polarizing the fibers.

7. The method of claim 6, wherein the electrostatically polarizing comprises:
positioning a first structure on a first side of the fibers and a second structure on a second side of the fibers that is opposite the first side; and
applying a voltage across the first structure and the second structure sufficient to electrostatically polarize the fibers.

8. The method of claim 1, wherein the electric field is a pulsed electric field.

9. The method of claim 1, wherein when the fibers are within the electric field, longitudinal axes of the fibers align with the electric field.

10. The method of claim 1, wherein in the desired orientation, not all of the fibers are parallel to each other.

11. The method of claim 1, wherein in the desired orientation, the fibers are in a non-uniform orientation.

12. The method of claim 11, wherein in the non-uniform orientation, some of the fibers are parallel to each other and are not parallel to others of the fibers.

13. The method of claim 1, wherein in the desired orientation, voids are present within regions of the fibers.

14. The method of claim 1, wherein the desired orientation imparts uniform material properties to the composite part.

15. The method of claim 1, wherein the desired orientation imparts non-uniform material properties to the composite part.

16. The method of claim 1, wherein the composite part comprises one or more of a score line, a fracture point, a drill hole location, or a radius associated with the desired orientation.

17. The method of claim 1, wherein during the encompassing, the fibers are within a slurry.

18. The method of claim 1, wherein during the encompassing, the fibers are within a gas environment.

19. The method of claim 1, wherein the fixing comprises applying a tackifier to the fibers, and wherein the tackifier comprises the matrix material.

20. The method of claim 1, wherein the fixing comprises applying a tape to the fibers, and wherein the tape comprises the matrix material.

21. The method of claim 1, wherein the fixing comprises compacting the composite part.

22. The method of claim 1, wherein the fixing comprises at least partially curing the composite part.

23. The method of claim 1,
wherein the fixing creates a first ply of composite material; and
wherein the method further comprises:
repeating the generating, the encompassing, and the fixing with respect to new fibers to create one or more additional plies of composite material; and
stacking the first ply of composite material with the one or more additional plies of composite material.

24. The method of claim 1, wherein following the fixing, the path of aligned fibers facilitates cutting or breaking the composite part along the path of aligned fibers.

25. The method of claim 24, further comprising following the fixing, breaking or cutting the composite part along the path of aligned fibers.

26. The method of claim 1, wherein the moving comprises creating a region that is void of fibers on the support structure.

27. The method of claim 26, wherein the region is circular.

28. The method of claim 26, wherein the region is linear.

29. The method of claim 26, wherein, following the fixing, the region facilitates cutting or breaking the composite part at the region.

30. The method of claim 29, further comprising, following the fixing, breaking or cutting the composite part at the region.

* * * * *